United States Patent [19]

Olsson

[11] E Patent Number: Re. 31,957

[45] Reissued Date of Patent: Jul. 30, 1985

[54] PNEUMATIC-HYDRAULIC TOOL, PREFERABLY FOR BLIND RIVETING

[76] Inventor: Lars E. G. Olsson, Kyrkogatan 61 A, S-671 03 Arvika, Sweden

[21] Appl. No.: 475,485

[22] Filed: Mar. 15, 1983

Related U.S. Patent Documents

Reissue of:

[64] Patent No.: 4,310,056
Issued: Jan. 12, 1982
Appl. No.: 109,978
Filed: Jan. 7, 1980

[30] Foreign Application Priority Data

Jan. 15, 1979 [SE] Sweden ..... 7900312

[51] Int. Cl.[3] ..... B23B 45/04
[52] U.S. Cl. ..... 173/169; 72/391
[58] Field of Search ..... 173/169, 170; 72/391

[56] References Cited

U.S. PATENT DOCUMENTS

| | | | |
|---|---|---|---|
| 3,082,898 | 3/1963 | Bosch | 72/391 |
| 3,392,632 | 7/1968 | Volkman | 173/169 |
| 3,630,067 | 12/1971 | Henshaw | 72/391 |
| 3,630,427 | 12/1971 | Stokes | 72/391 |
| 3,680,202 | 8/1972 | Siebol et al. | 29/540 |
| 3,777,540 | 12/1973 | Siebol et al. | 72/391 |
| 3,880,023 | 4/1975 | Amsberg et al. | 72/391 |
| 3,898,833 | 8/1975 | Richardson | 72/391 |
| 4,088,003 | 5/1978 | Schwab | 72/391 |
| 4,120,188 | 10/1978 | Schwab | 72/391 |
| 4,187,708 | 2/1980 | Champoux | 173/169 X |

FOREIGN PATENT DOCUMENTS

| | | | |
|---|---|---|---|
| 2425385 | 12/1975 | Fed. Rep. of Germany | 72/391 |
| 2306034 | 10/1976 | France | 72/391 |
| 437913 | 11/1935 | United Kingdom . | |
| 489583 | 7/1938 | United Kingdom . | |
| 927795 | 6/1963 | United Kingdom | 72/391 |
| 995499 | 6/1965 | United Kingdom . | |
| 1235855 | 6/1971 | United Kingdom . | |

*Primary Examiner*—Ronald Feldbaum
*Attorney, Agent, or Firm*—Murray, Whisenhunt and Ferguson

[57] ABSTRACT

A pneumatic-hydraulic blind riveting tool comprises on the one hand a hydraulic working piston (25) in a hydraulic cylinder (27) cooperating with a chuck, and on the other hand a pneumatic power piston device (50) in an air cylinder (51) adapted to produce a working pressure in the hydraulic medium by means of a plunger (49). The working piston is adapted to be fed forwards in the hydraulic cylinder a number of steps during each working cycle, and means are provided to cause the power piston device to execute a corresponding number of stroke cycles, each of which includes a forward and return piston stroke.

The working piston is adapted to be fed forward one step on each piston stroke. A valve (31) in a plunger passage (29) prevents hydraulic medium from retreating in the plunger passage during the return movement of the plunger. Instead, the plunger passage is filled with hydraulic medium from a reservoir (69) during the backward movement. When the working cycle is completed, an oil return passage (30) is opened. Through this, the hydraulic medium is returned to the reservoir from the hydraulic cylinder while the working piston returns to the initial position.

The power piston, the air cylinder, the plunge, the reservoir, and a feed piston for the hydraulic medium are provided in an elongated handle (6), and the plunge extends from the power piston into and through the reservoir and through the feed piston in the reservoir and further into a plunge passage ahead of the reservoir.

15 Claims, 4 Drawing Figures

PNEUMATIC-HYDRAULIC TOOL, PREFERABLY FOR BLIND RIVETING

Matter enclosed in heavy brackets [ ] appears in the original patent but forms no part of this reissue specification; matter printed in italics indicates the additions made by reissue.

TECHNICAL FIELD

The present invention relates to a pneumatic-hydraulic tool, preferably a tool for producing so-called blind rivets, comprising on the one hand a hydraulic working piston in a hydraulic cylicylinder adapted by means of a plunger to provide a working pressure in the hydraulic medium in the hydraulic cylinder. When the invention is used in the preferred field of application, a tool for blind riveting, the chuck or corresponding gripping member engages round the so-called mandrel of the rivet.

Preferably the invention relates to a device for producinng a riveted connection with a blind rivet, a so-called POP rivet, of which the so-called mandrel or rivet mandrel is fed by the rivet until its mandrel breaks, and a working piston cooperating with the chuck is adapted to be driven by a hydraulic medium, the working pressure of which is obtained by means of a pneumatic-hydraulic power piston device. Other fields where the principles of the invention can be used are, for example, tools for pulling out nails and strapping tools.

BACKGROUND

Blind rivets, often called POP rivets, are understood to mean tubular rivets mounted on a rivet mandrel, a so-called mandrel, which means that the riveting can be effected from one side; blind riveting. This type of riveting has been used since the turn of the century and during the years a number of different blind riveting tools have been developed, both manual and automatic. Among the automatic ones there are both pneumatic and pneumatic-hydraulic ones. Of these, the pneumatic-hydraulic tools have the highest performance and a number of forms of embodiment of this type of tool exist. But despite the many different embodiments of the standard tool, there are places which are difficult to reach or are inaccessible for riveting. This is associated with the fact that the tool is comparatively heavy and bulky, which in turn depends on the principle of construction and operation of the tool hitherto used which presupposes a very large volume of air for the power piston device and also a considerable volume of oil. This is illustrated for example by the Swedish Pat. No. 204,389, U.S. Pat. No. 3,680,202 and the German Patent publications Nos. 2 154 788 and 2 605 648.

In order to increase the possibility of being able to rivet in places which are difficult of access, therefore, extensions of various types have been adopted. Often, however, one is forced to use hand tools in many places which are difficult of access.

Another disadvantage of existing pneumatic-hydraulic blind riveting tools is their high noise level. This is also associated with the large volume of air cylinder in the pneumatic part. Admittedly it is theoretically possible to provide the tool with a noise suppressor. In practice, however, it is difficult to do this because a noise suppressor would further increase the size and weight of the tool which is already too large and heavy, so that it would become almost unmanageable as a single-handed tool.

DISCLOSURE OF INVENTION

One object of the invention is to offer a tool for blind riveting and other operations which presuppose that an object such as a rivet mandrel is fed a certain distance, which tool can be made smaller or with smaller outside dimensions and can be made lighter and easier to handle than previously known tools with a corresponding performance in other respects.

Another object of the invention is to offer a tool of said kind which works at a lower noise level than could be achieved with known tools of a corresponding kind.

Still another object of the invention is to offer a tool of the present kind, in which the interior of the tool is readily accessible for inspection and maintenance.

These and other objects can be achieved in that there is a reservoir for the hydraulic medium and a feed piston in said reservoir, that the power piston device, the air cylinder, the plunge, the reservoir and the feed piston are provided in an elongated grip handle, and that the plunge in the grip handle extends from the power piston device through the feed piston and through the hydraul medium reservoir and further into a plunger passage ahead of the hydraul medium reservoir, said plunger passage communicating with the hydraulic cylinder.

More specifically the power piston device, the air cylinder, the plunge, the hydraul medium reservoir, and the feed piston are provided in a cylindrical power piston housing which forms part of the said handle.

Advantageously, according to an aspect of the invention, the grip handle also comprises an under member provided along the power piston housing, the under member having a shape mating with the shape of the power piston housing and containing pneumatic valve means. Preferably said valve means comprise a shuttle in a shuttle passage, which shuttle is adapted to be able to transferred from a front position and vice versa and so act as a valve body to introduce driving air to the respective part of the air cylinder and to draw off exhaust air to a noise suppressor which preferably also is provided in the handle.

Further features and advantages of the invention will be apparent from the following description of a preferred form of embodiment.

SHORT DESCRIPTION OF FIGURES

In the following description of the preferred form of embodiment, reference is made to the accompanying Figures. In the Figures.

DESCRIPTION OF PREFERRED FORM OF EMBODIMENT

Figure 1:
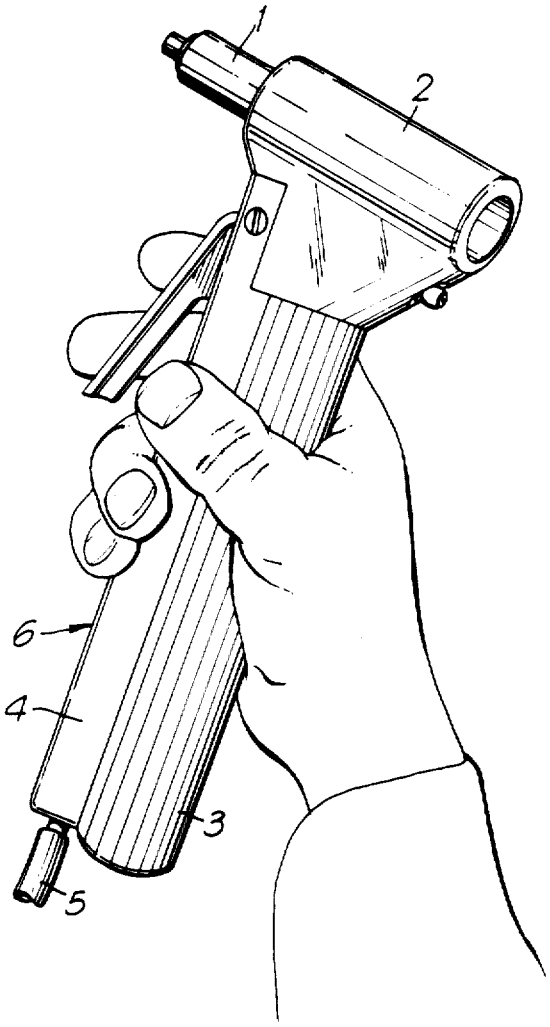
FIG. 1 shows a perspective view of a blind riveting tool according to the preferred form of embodiment of the invention.

Referring first to FIG. 1, the nose of the riveting tool is generally designated by the numeral 1. The nose 1 of the tool surrounds a chuck, not shown, and is screwed into a tool head 2 containing, inter alia, a working piston in a hydraulic cylinder, which will be explained in more detail with reference to other figures. Screwed into the tool head 2, at an angle in relation thereto, is a straight, cylindrical housing 3 which inter alia includes a power piston device. The housing 3 is therefore called hereinafter "power piston housing". Disposed below the power piston housing 3 by means of screws not shown is an under member 4. A compressed air line 5 is connected to the under member 4. The power piston housing 3 and the under member 4 together form a grip handle 6 with an operating handle or trigger.

Figure 2:
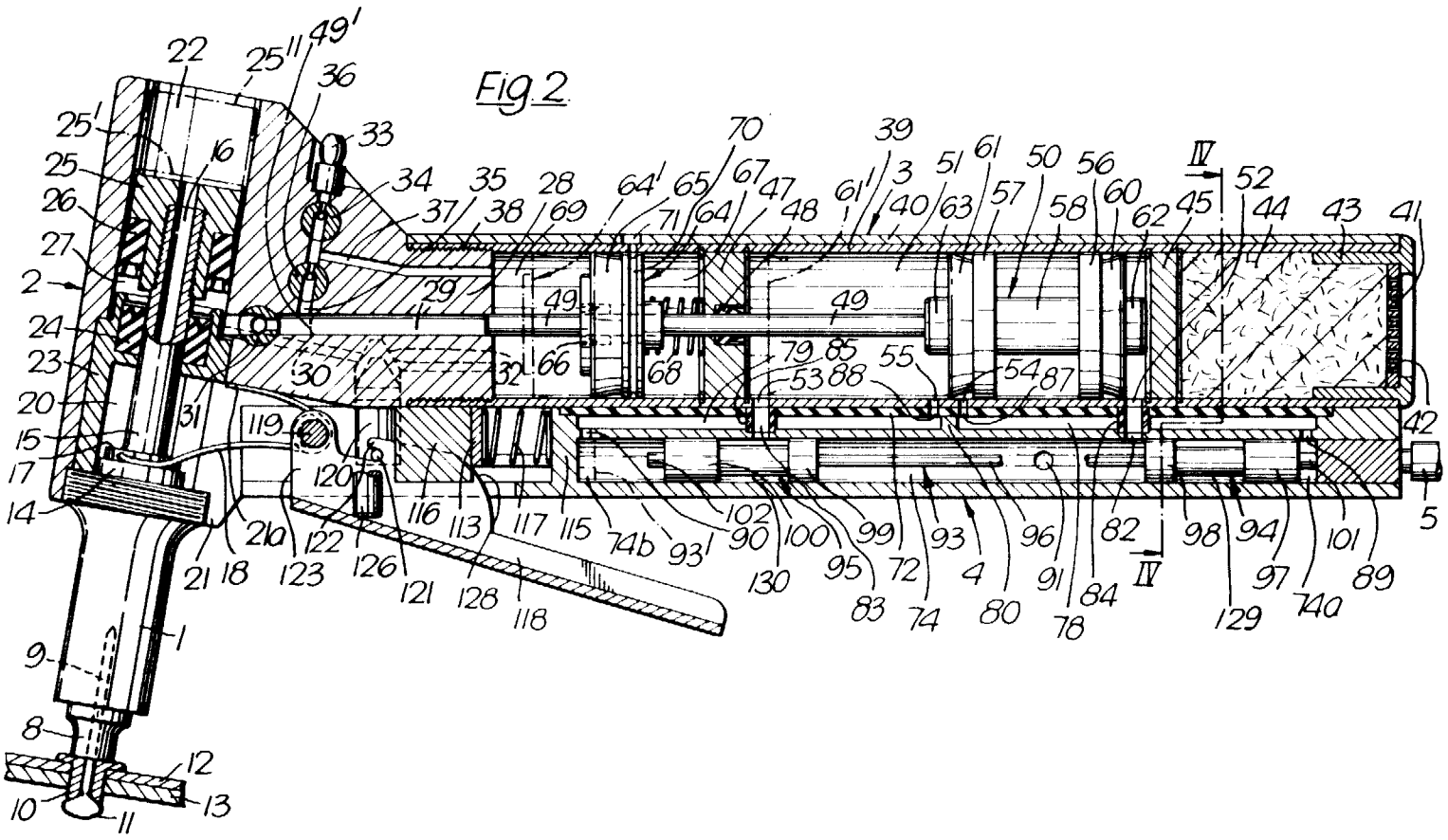
FIG. 2 shows a longitudinal central section through the tool.

Referring now to FIG. 2, the nose 1 screwed into the tool head 2 comprises at the front a nozzle 8 with a drill hole passing through axially for the mandrel 9 on a blind rivet 10. An indication of fracture on the mandrel 9 is designated by 11, and a pair of thin plates which are to be riveted together are designated by 12 and 13. The mandrel 9 is gripped by a chuck, not shown, which can be displaced inside the nose 1 in relation to the nozzle 8. The chuck is combined with a chuck holder 14 which in turn is connected to a piston rod 15. The piston rod 15 comprises a longitudinal drill hole 16 which extends axially and which is in direct communication with the axial drill hole in the nozzle 8 for the mandrel 9 via a corresponding bore in the chuck holder 14. At each side of the chuck holder 14 there is a boss 17 for a pair of fork-shaped springs 18, 19.

Extending through the tool head 2 is a central axial cavity which in its front portion 20 opens in the direction of the under member and forms a mouthlike opening 21 for the fork springs 18, 19 which are compressed between the chuck holder 14 and the back wall 21a of the mouth 21. The front portion 20 of the through cavity is somewhat wider than the back portion 22. Pressed in the former 20, or possibly screwed in with a sealing fit is an intermediate member 23. A U-sleeve 24 of PTFE or the like is disposed in the intermediate member 23 with a sealing fit partly against the seat in the intermediate member, partly against the piston rod 15.

A working piston 25 is screwed into the rear end of the piston rod 15. The working piston 25 is adapted to be able to be displaced in the rear cavity 22 from the front position which is shown in FIG. 2 to the back position which is marked by chain lines 25" in FIG. 2. A U-sleeve 26 is mounted in the working piston 25 and adapted to be able to slide with sealing against the wall of the cavity 22. The space between, on the one hand the intermediate member 23 and the associated U-sleeve 24 and on the other hand the working piston 25 with the associated U-sleeve 26 is filled with hydraulic medium, normally oil, and is hereinafter called the hydraulic cylinder 27.

Extending through that part of the tool head 2 which can be called its neck 28 are two passages leading into hydraulic cylinder 27, namely a plunger passage 29 and an oil return passage 30. In the plunger passage 29 there is a non-return valve 31, shown diagrammatically, which blocks in the direction from the hydraulic chamber 27. A needle valve 32 in the oil return passage is likewise shown diagrammatically. An oil nipple 33 with a non-return valve 34 is disposed in the back of the tool head to fill the hydraulic system with oil. A filling passage from the oil nipple 33 leading into the plunger passage 29 is designated by 35. A non-return valve 36 is disposed in the filling passage 35, blocking in the direction from the plunger passage.

Yet another passage extends through the neck 28 of the tool head, namely a feed passage 37 which leads into the filling passage 35 between the valves 34 and 36.

Figure 4:
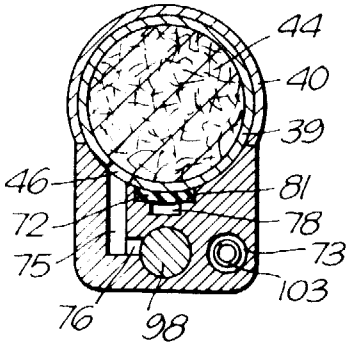
FIG. 4 is a section IV—IV in FIG. 2.

The tool head 2 is screwed by its neck 28 by threads 38 into the power piston housing 3. This consists of a straight tube 39, preferably of aluminium. The upper portion of the tube 39 is covered by a cover 40 of grooved plastics material or another easily grasped material. The back end of the tube 39 is covered by a washer 41 which is provided with perforations 42. The washer 41 is held in position by an open back member in the form of a sleeve 43. In front of the washer 41 there is a noise-damping chamber 44 which is filled with sound-damping material, for example foam plastics, fibre compound or the like. The noise damping chamber 44 is bounded at the front by a back partition 45 which is fixed in the tube 39 by means of a pair of Seeger locking means. A vent opening in the wall of the noise-damping chamber 44 is designated by 46, FIG. 4.

A front partition in the power piston housing 3 is designated by 47 and is fixed in the tube 39 by means of Seeger locking means in the same manner as the back partition 45. The front partition 47 comprises a duct 48 with a U-sleeve which bears with a sealing action against a plunger 49 on a power piston device designated in general by 50. The space between the two partitions 45 and 47 is called the air cylinder and is designated by 51. The air cylinder 51 has a back and a front driving air opening 52 and 53 respectively and a back and a front control air opening 54 and 55 respectively. The power piston device 50 consists of a back and a front piston 56 and 57 respectively, connected by an intermediate member 58. A back and front sealing sleeve 60 and 61 associated with the pistons 56 and 57 respectively are adapted to be able to slide with a sealing action against the inside of the tube 39. A back and a front end piece on the power piston device 50 are designated 62 and 63 respectively. The power piston device 50 thus described with the associated plunger 49 can be displaced from the back starting position shown in FIG. 2 to a front position which is illustrated by chain lines 61' for the front sleeve 61 in the air cylinder 51 and by chain lines 49' for the plunger 49 in the plunger passage 29.

Disposed in front of the front partition 47 is an oil feed piston 64 with a U-sleeve 65 which seals against the wall of the tube 39 and a U-sleeve 66 which seals against the plunger 49. The oil feed piston 64 together with the front partition 47 and the intermediate chamber 67 in between delimit the pneumatic and hydraulic systems of the tool from one another. An oil feed spring in the intermediate chamber is designated by 68. The space between the oil feed piston 64 and the tool head 2 forms an oil reservoir 69, the maximum volume of which is illustrated in FIG. 2. In this position, a coloured marking 70 on the oil feed piston 64 is in the middle in front of an opening 71 in the tube 39 and the cover 40, and the coloured marking 70 indicates that the oil feed piston 64 has assumed its back position. The oil feed piston 64 can slide on the plunger 49 and its front position is indicated by the chain line 64'. In the position 64', the oil reservoir 69 contains the minimum amount of oil. The under member 4 is made in one piece and with a shape which matches the tube 39 in the power piston housing 3. The under member 4 and the power piston housing 3 are connected by means of screws not shown. Between the under member 4 and the tube 39 there is an elongated packing 72 of rubber or rubber-like material. The function of the packing 72 will be clear from what follows.

Figure 3:
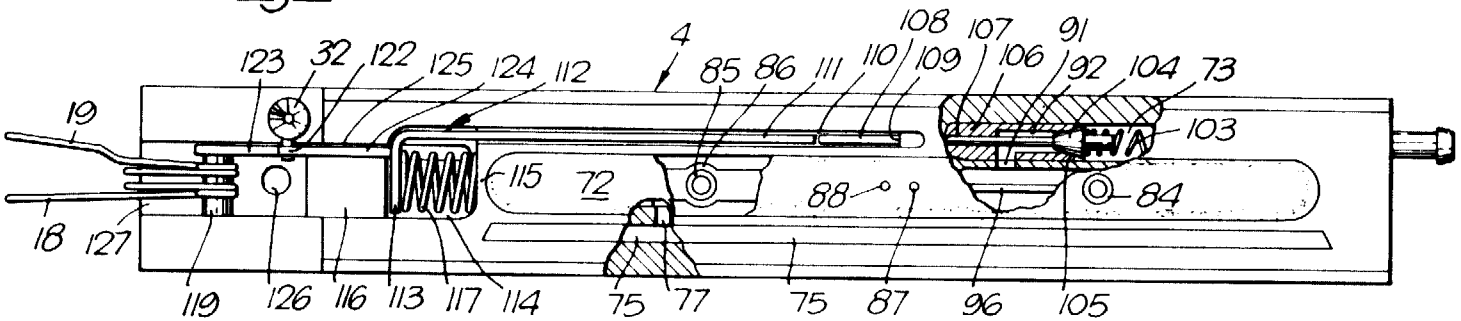
FIG. 3 is a plan view from above of an under member included in the tool.

The under member 4 has two longitudinal drill holes, namely an inlet passage 73 for compressed air, FIG. 3, and a passage which is plugged at the back end, called a shuttle passage 74. Also in the under member 4, extending down from the tube 39, are a plurality of longitudinal cut-out grooves. One of these, called a venting groove 75 is in communication with the venting opening 46 in the noise-damping wall. The venting groove 72 is deep and extends down to the level of the shuttle passage 74 and extends substantially along its length, and between the shuttle passage 74 and the venting groove 75, at the same level are a back (FIG. 4) and a front (FIG. 3) venting passage 76 and 77 respectively. A second and third groove, called back and front connecting paths 78 and 79 respectively, are quite shallow but on the other hand considerably broader. More specifically, the connecting paths 78 and 79 are disposed right above the shuttle passage 74 and are separated from one another by a blocking wall 80. Extending round the connecting paths 78 and 79 is a common shelf 81. Resting on the shelf are the above-mentioned packings 72 which completely cover the connecting paths 78 and 79. The packing 72 is provided with openings coaxial with the back and front driving air openings 52 and 53 in the tube 39 to the air cylinder 51. In the same manner, openings 82 and 83 are provided in the roof of the shuttle passage 74, coaxial with the openings 52, 53 in the air cylinder wall. The openings 52 and 82 are connected by a back tube 84 connected to the packing 72. In a corresponding manner, a front tube 85 is disposed between the openings 53 and 83 so that two passages are formed between the air cylinder 51 and the shuttle passage 74 shielded from the connecting paths 78 and 79. As can be seen from FIG. 3, the passages 86 are disposed at both sides of the tube 85 so that the spaces in the front connecting path 79 in front of and behind the tube 85 are in communication with one another. In the same manner, the spaces in front of and behind the back tube 84 communicate with one another in the back connecting path 78 through passages disposed at both sides of the tube 84.

The back connecting path 78 further communicates with the air cylinder 51 via the back control air opening 54 in the tube 39 and a back control air opening 87 coaxial with said opening 54 in the packing 72. In the same way there is also a front control air opening 88 in the packing 72 which is coaxial with the front control air opening 55 in the air cylinder wall. Furthermore, the back connecting path 78 communicated with the shuttle passage 74 through a back hole 89 disposed right at the back. In the same manner, at the very front there is a front hole 90 between the front connecting path 79 and the shuttle passage 74. Finally, there is a compressed-air inlet 91 between a valve pipe 92 in the inlet pipe 72 and the shuttle passage 74, FIG. 2 and FIG. 3.

The shuttle in the shuttle passage 74, generally designated by 93 consists of a back and a front shuttle piston 94 and 95 respectively, connected to one another by means of a rod 96. Each shuttle piston 94 and 95 comprises a pair of piston flanges 97 and 98 or 99 and 100 respectively, which are adapted to slide against the wall of the shuttle passage. The annular spaces between the piston flanges are designated by 129 and 130. At the back of the back shuttle piston 94 there is a back end member 101. In a similar manner, the front shuttle piston 95 comprises a front end member [103] *102*. Each shuttle piston 94 and 95 is made in one piece, preferably of PTFE. The shuttle 93 can be displaced from its initial position shown in FIG. 2 to a forward position indicated by chain lines 93'.

Returning to the inlet conduit 73 for compressed air, a spring 103 is disposed in this which presses a valve cone 104 against a valve seat 105 in a valve housing 106. In the valve housing 106 there is a conduit 92 called a valve conduit which communicates with the shuttle passage 74 via the compressed-air inlet 91, and a through bore 107 in which there is mounted a valve spindle 108 connected to the valve cone 104. The valve spindle 108 extends past the front edge 109 of the valve housing 106 in a link groove 110 cut out of the under member 4.

Freely mounted in the link groove 110 is the longer arm 111 of an L-shaped link 112. The shorter arm 113 of the link 112 extends in over the centre line of the lower member in the region in front of a space 114 between the common front wall 115 of the shuttle passage 74 and the front connecting path 79 and a front boss 116. In the position of rest, the arm 113 is pressed against the front boss 116 by means of a spring 117 disposed between the arm 113 and said wall 115.

A trigger or control handle is generally designated by 118. The trigger can be turned about a joint 119 by being taken upwards from the position shown. The joint 119 also carries the fork springs 18 and 19 which do not, however, affect the operation of the trigger. Instead, a return spring, not shown, round a pin 126 is provided to return the trigger 118. A valve spindle connected to the valve body 32 is designated by 120. A laterally directed stud 121 on the valve spindle is engaged round by an extention 122 on the trigger. The joint 119, the fork springs 18 and 19, the pin 126 with associated return spring and the front portion 123 of the trigger 118 are all disposed in a front recess 127 in the lower member 4. An intermediate portion 124 of the trigger 118 on the other hand is freely mounted in a trigger groove 125. A cam surface 128 on the intermediate portion 124 of the trigger is adapted to be able to be pressed against the front arm 113 of the link 112 by turning the trigger about the joint 119.

The method of working of the riveting tool described above will now be described, the pneumatic functions of the tool being explained first. It is assumed that the initial position is that illustrated in FIG. 2. Compressed air is connected to the air inlet 73. When the trigger 118 is pressed upwards and turned about the joint 119, the cam surface 128 is pressed and slides against the front arm 113 of the link 112. The longer arm 111 of the link 112 is then pressed backwards into the link groove 110, while at the same time its shorter arm 113 compresses the spring 117. When the arm 111 is thus pressed backwards in the groove 110 it strikes against the valve spindle 108 and conveys this backwards in the valve housing 106 so that the valve cone 104 is released from the valve seat 105. Compressed air then flows through the valve via the valve conduit 92 and the compressed-air valve opening 91 into the shuttle passage 74 between the shuttle pistons 94 and 95. In this position, the shuttle 93 is not acted upon by the air which instead continues through the opening 82, the tube 84 and the driving air opening 52 up into the air cylinder 51 behind the back piston 56. The power piston device 50 and plunger 49 are then driven forwards by the compressed air behind the back piston 56, while at the same time the volume of air in the air cylinder in the space in front of the front piston 57 is drawn away through the front driving air opening 53, the tube 85 and the opening 83 down into the shuttle passage in the annular space 130 between the front and back piston flanges 99 and 100 of the shuttle piston 95. From the space 130, the exhaust air continues through the front venting passage 77, FIG. 3, into the venting groove 75 and from there through the venting opening 46, FIG. 4, into the noise-damping chamber 44. Here the noise is damped after which the exhaust air leaves the tool through the washer 41 in the back end of the tool. This operational phase takes place until the back sealing sleeve 60 of the power piston device 50 has passed the back control air opening 54 in the wall of the air cylinder, that is to say in the tube 39. With this the operational phase I of the pneumatic equipment is terminated. The front sealing sleeve 61 of the power piston device 50 has reached position 61' and the plunger 49 has reached the position 49' in the plunger passage 29.

When phase II of the pneumatic system is introduced, the compressed air continues in the same manner as in phase I to flow into the back half of the air cylinder 51 behind the back piston 56 through the opening 52 but then continues directly down into the back connecting path 78 via the back control air openings 54 and 87. The air passes through the back tube 84 (see in FIG. 3 corresponding passages 86 for the front tube 85) and flows via the back hole 89 down into the space 74a of the shuttle passage 74 behind the back shuttle piston 94. Phase II means therefore that the shuttle 74 is displaced from its [front to its back] *back to its front* position, while the power piston device 50 remains still in its front position during this phase, the front sealing sleeve adopting the position 61'.

As a result of the fact that the shuttle 74 is conveyed forwards into its front position, the front flange 98 of the back shuttle piston 94 breaks the connection between the compressed-air valve opening 91 and the opening 82. Instead, during phase III, there is a direct connection via the shuttle passage 74 between the compressed-air valve opening 91 and the opening 83. Thus, during phase III, the air flows up through the opening 83, the tube 85, and the opening 53 into the front portion of the air cylinder 51 in front of the front piston 57 and restores the power piston device 50 to the initial position. At the same time, the air in the back half of the air cylinder [50] *51* is forced out through the driving air opening 52, the tube 84 and the opening 82 down into the shuttle passage in the region in front of the annular space 129 of the back shuttle piston 94, which during phase 3 covers both the opening 82 and the back venting passage 76, FIG. 4. Via the latter, the air flows again into the venting groove 75 and then into the sound damping chamber 44 through the venting opening 46 in the same manner as during phase I, although during phase III, the air comes instead from the back portion of the air cylinder 51. When phase IV begins, the power piston device 50 is again in its back initial position, while the shuttle 93 is still in its front position 93'. The latter means that the connection between the compressed-air valve opening 91 and the front half of the air cylinder 51 is still open via the shuttle passage 74, the opening 83, the tube 85 and the opening 53. From the front half of the air cylinder 51, the air continues through the openings 55 and 88 down into the front connecting path 89, passes the tube 85 via the passages 86, (FIG. 3) and flows down into the space 74b in front of the front shuttle piston 95. The air blast conveys the shuttle 93 back to the back initial position, and a stroke cycle in the pneumatic system is completed. In this manner, successive stroke cycles are repeated so long as the trigger 118 is held pressed in until a riveting operation has been completed.

The other functions, a priori the hydraulic functions of the tool will now be explained. In this case, too, the initial position is assumed to be that which is shown in FIG. 2. A hydraulic medium, which in this description is assumed to consist of oil, fills all the hydraulic spaces such as the hydraulic cylinder 27, the plunger passage 29, the oil return passage 30, the filling passage 35, the feed passage 37 and the oil reservoir 69.

By moving the trigger 118 upwards, the valve spindle 120 is lifted by the engagement of the stud 121 with the trigger so that the valve body 32 shuts off the oil return passage 30. At the same time, the air piston device 50 urges the plunger 49 forwards in the plunger passage 29 to the position 49' (phase I in the stroke cycle of the pneumatic system). The oil in the plunger passage 29 in the region in front of the stroke of the plunger 49 is forced past the non-return valve 31 which opens, and into the hydraulic cylinder 27. At this moment, the non-return valve 36 has a blocking action. The working piston is forced backwards a little to the position 25' corresponding to the amount of oil introduced from the plunger passage.

During phase III of the pneumatic system, the power piston device 50 and the plunger 49 return to the initial position. The non-return valve 31 in the plunger passage prevents the oil from retreating in the plunger passage 29 from the hydraulic cylinder. At the same time, the non-return valve 31 consequently also prevents the working piston 25 from retreating from the position 25' which it assumed during phase I of the first stroke cycle of the pneumatic system, but remains in the position 25' during phase II of the same stroke cycle. Instead, the non-return valve 36 in the filling passage 35 now opens and oil from the oil reservoir 69 flows into the plunger passage 29 via feed conduit 37 and the filling passage 35 through the open valve 36. At the same time, the spring 68 helps the oil feed piston 64 to move forward a little corresponding to the amount of oil transferred to the plunger passage during phase III.

During the next stroke cycle executed by the power piston device 50, the working piston 25 is urged back one step further from the position 25' during the new phase I and the oil feed piston 64 moves forward one step in the oil reservoir 69'. At the same time, the working piston 25 entrains the chuck holder 14 and the rivet mandrel 9, the fork springs 18 and 19 being compressed all the more between the chuck holder 14 and the back wall 21a of the mouth 21. In this manner the operation continues while the trigger 118 is held pressed in the whole time until the working piston 25 reaches its back end position 25'', when the mandrel 9 breaks at the indication of fracture 11. The oil feed piston 64 has then reached the position 64'.

When the mandrel 9 breaks, the rivet connection is finished. The operator allows the trigger 118 to return to the initial position, and the valve body 32 in the oil return passage 30 is restored to its non-blocking initial position. At the same time, the spring 117 restores the link 111 to the initial position, and the spring 103 in the inlet conduit 73 for compressed air again presses the valve cone 104 against the valve seat 105, so that the pneumatic system is prevented from executing further stroke cycles.

As the plunger 49 is thus brought to a standstill and the oil return passage 30 is again opened, the working piston 25 can be restored to the initial position. This takes place with the air of the fork springs 18 and 19 which press forward the chuck holder 14 and so the working piston 25 to the front initial position. Oil from the hydraulic cylinder 27 is returned to the oil reservoir 69 via the oil return passage 30, while at the same time the oil feed piston 64 is pressed back into the initial position. Thus the working cycle of the hydraulic system has been completed. The number of stroke cycles which the pneumatic system executes during the working cycle of the hydraulic system depends on the dimensioning of the components included in the system. With the form of embodiment shown, the pneumatic system executes thirteen stroke cycles and the working piston 25 is driven as many steps backwards during the working cycle of the hydraulic system before the rivet mandrel breaks.

As a final step, the operator removes the pulled-off rivet mandrel via the drill hole 16 and the cavity 22.

I claim:

1. A pneumatic-hydraulic tool, preferably for blind riveting, comprising a hydraulic working piston in a hydraulic cylinder, cooperating with a chuck or corresponding gripping member, a pneumatic power piston device in an air cylinder adapted to provide a working pressure in the hydraulic medium by means of a plunger, a reservoir for the hydraulic medium, and a feed piston in the hydraulic reservoir, characterized in that the power piston device (50), the air cylinder (51), the plunge (49), the hydraulic medium reservoir (69), and the feed piston are provided in an elongated grip handle (6), and that the plunge in the grip handle extends from the power piston device through the feed piston and through the hydraulic medium reservoir and further into a plunger passage (29) which is positioned ahead of the hydraulic medium reservoir, said plunger passage communicating with the hydraulic cylinder (27).

2. Tool as claimed in claim 1, characterized in that the power piston device, the air cylinder, the plunge, the hydraulic medium reservoir, and the feed piston are provided in a cylindrical power piston housing (3) which forms part of the said handle.

3. Tool as claimed in claim 2, characterized in that the grip handle also comprises an under member (4) provided along the power piston housing, the under member having a shape mating with the shape of the power piston housing and containing pneumatic valve means.

4. Tool as claimed in claim 3, characterized in that said valve means comprise a shuttle (93) in a shuttle passage (74), which shuttle is adapted to be able to be transferred from a front position and vice versa and to act as a valve body to introduce driving air to the respective part of the air cylinder and to draw off exhaust air to a noise suppressor (44) which preferably also is provided in the handle.

5. Tool as claimed in claim 4, characterized in that the shuttle comprises a back and a front shuttle piston (94, 95), that an inlet (91) for compressed air is provided in the shuttle passage between said shuttle pistons and that back and front openings (89, 90) are provided in the shuttle passage to displace the shuttle between the back and front positions.

6. Tool as claimed in any of the claims 1–5, characterized in that the air cylinder (51) comprises back and front driving air openings (52, 53), that means are provided to convey the exhaust air from the front portion of the air cylinder from the front driving air opening (53) to the noise suppressor (44) when the compressed air is introduced into the back portion of the air cylinder through a back driving air opening (52), and that in a corresponding manner, means are provided to convey exhaust air from the back portion of the air cylinder to the noise suppressor when compressed air is instead introduced through a front driving air opening (53).

7. Tool as claimed in claim 6, characterized in that the air cylinder is in direct communication with the shuttle passage via the back and the front driving air openings (52, 53), and also in communication with the shuttle passage via more centrally disposed back and front control air openings (54, 55), back and front connecting paths (78, 79) and said back and front openings (89, 90) in the shuttle passage.

8. Tool as claimed in claim 1 characterized by means (18, 19) for restoring the working piston to the initial position when a working cycle is completed and means (30) for returning hydraulic medium from the hydraulic cylinder to the reservoir when the working cycle is completed, said means for returning the hydraulic medium preferably consisting of an oil return passage (30) between the hydraulic cylinder and the reservoir and a valve (32) between the hydraulic cylinder and the reservoir, adapted to be opened at the same time as the introduction of compressed air to the air cylinder (51) is interrupted.

9. Tool as claimed in claim 1 characterized in a trigger or control handle (118) adapted on the one hand to control the valve (32) in the oil return passage (30) such that the valve is closed in the operating position of the trigger and vice versa, and on the other hand at the same time to control a valve means (104, 105) in an air inlet passage (73) such that said valve means is open in said operating position of the trigger and vice versa.

10. Tool as claimed in claim 9, characterized in that the trigger (118) is pivoted by means of a hinge means (119) in the under member, and that said hinge means also is adapted to position one or more fork springs (18, 19) provided to return the chuck or corresponding gripping member to the starting position.

*11. A pneumatic-hydraulic tool comprising a hydraulic cylinder containing hydraulic fluid, a hydraulic working piston movable in a series of steps in said hydraulic cylinder, a gripping member connected to said working piston and movable thereby, an air cylinder, a pneumatic power piston cyclically movable in said air cylinder, a plunger means connected to the power piston for providing a working pressure to the hydraulic fluid, a hydraulic fluid reservoir, feed means in said reservoir for maintaining the hydraulic fluid under feed pressure, said tool having a head and an elongated grip handle, said power piston, said air cylinder, said plunger means, said reservoir and said feed means located in said elongated grip handle, a plunger passage located between said reservoir and said hydraulic cylinder, said plunger means extending from said power piston through the feed means into said plunger passage and cyclically movable therein, said hydraulic working piston moving one step in said hydraulic cylinder on each cyclic stroke of said power piston and said plunger, said feed means filling said plunger passage with an amount of hydraulic fluid corresponding to the amount fed into the hydraulic cylinder by the preceding plunger stroke from said reservoir upon each stroke of the plunger when the plunger moves away from the hydraulic cylinder.*

*12. Tool as claimed in claim 11, wherein the plunger passage terminates at one end in the hydraulic cylinder, and a valve means is located between the plunger and the hydraulic cylinder for preventing the hydraulic fluid from retreating in the plunger passage from the hydraulic cylin-*

*der during the stroke of the plunger when the plunger moves away from the hydraulic cylinder.*

*13. Tool as claimed in claim 11, wherein said plunger means extends from said power piston through said reservoir into said plunger passage.*

*14. Tool of claim 11, wherein said tool is a blind riveting tool, wherein said gripping member grips the mandrel of a mandrelled rivet.*

*15. Tool of claim 14, including restraining means for restraining the head of a mandrelled rivet having its mandrel gripped in said gripping means during movement of said gripping means and mandrel.*

* * * * *